March 16, 1948.  M. L. WHITSON ET AL  2,437,718
EXPANDING MANDREL
Filed March 26, 1945  2 Sheets-Sheet 1

Inventors
MERCER L. WHITSON.
HIAWATHA F. COLLETTE.
By Ralph L. Chappell
Attorney March 16, 1948.    M. L. WHITSON ET AL    2,437,718
EXPANDING MANDREL
Filed March 26, 1945    2 Sheets-Sheet 2

Inventors
MERCER L. WHITSON
HIAWATHA F. COLLETTE.

By Ralph L Chappell
Attorney

Patented Mar. 16, 1948

2,437,718

UNITED STATES PATENT OFFICE 2,437,718

EXPANDING MANDREL

Mercer L. Whitson, Norfolk, and Hiawatha F. Collette, Portsmouth, Va.

Application March 26, 1945, Serial No. 584,990

6 Claims. (Cl. 18—45)

(Granted under the act of March 3, 1883, as amended April 30, 1928; 370 O. G. 757)

This invention relates to an expansible work support especially adapted to be utilized for supporting work which is to be fabricated and shaped to conform thereto and in particular to an expansible support for use in fabricating valve, fitting and flange covers such as are employed in the lagging of steam and other hot gas or hot liquid transporting lines. As will be appreciated, especially where an unlagged pipe line is utilized for carrying such substances for considerable distances from the source of supply to the destination, an appreciable amount of heat is dissipated by means of radiation to surrounding surfaces as well as by conduction to the surrounding air.

One object of this invention is to provide a substantially cylindrical work support which is composed of sections and which may be adjusted to provide a support having various diameters in the general form of a cylinder, of a form having one or more cylindrical sections of diameters different from that of the remaining sections, or of a form similar to that of a stepped cone. Thus, regardless of irregularity of shape of valve, flange or other pipe fitting to be lagged, it is possible to form a suitable cover by merely adjusting the various sections of the mandrel to the shape desired.

Another object of this invention is to provide a work support of sheet metal which is adapted to be assembled readily and adjusted to the form desired.

Another object of this invention is to provide a support which may be collapsed readily for permitting the removal of the work pieces therefrom which have been fabricated thereon.

Other objects as well as the various other features of this invention will be apparent from an examination of the description and the accompanying drawings, of which:

Figure 1:
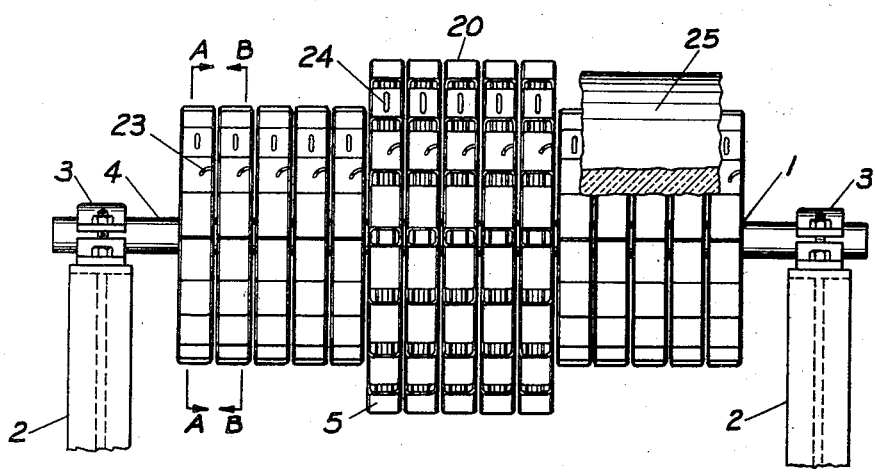
Fig. 1 is a side elevation view of the work support.

With reference to the drawings, Fig. 1, the work support 1 is mounted on conventional pedestals 2 having readily releasable bearing clamps 3, which will permit shaft 4 with the plurality of identical expansible sections 5 mounted thereon to be rotated as desired.

The novel features of this invention reside primarily in the construction of the sections which, with particular reference to Figs. 2 through 5 is as follows: Each section includes a pair of discs 6 and 7 perforated at their centers 8 and 9 respectively for mounting on shaft 4. Disc 6 is fixed to shaft 4 by any convenient means, such as by a set screw 10 secured to integral collar 11. Disc 7, however, is free to rotate on shaft 4 and, although adapted to communicate with disc 6, is spaced therefrom by means of a pair of collars 12 and 13 secured to the shaft 4.

A series of equally spaced arcuate slots 14, of equal length and having equal radii, are cut in the fixed disc 6. The slots 14, making equal angles with the radii of the disc 6, are generated from points near the center of the disc and are as close together as possible without affecting the strength thereof.

Figures 2, 5:
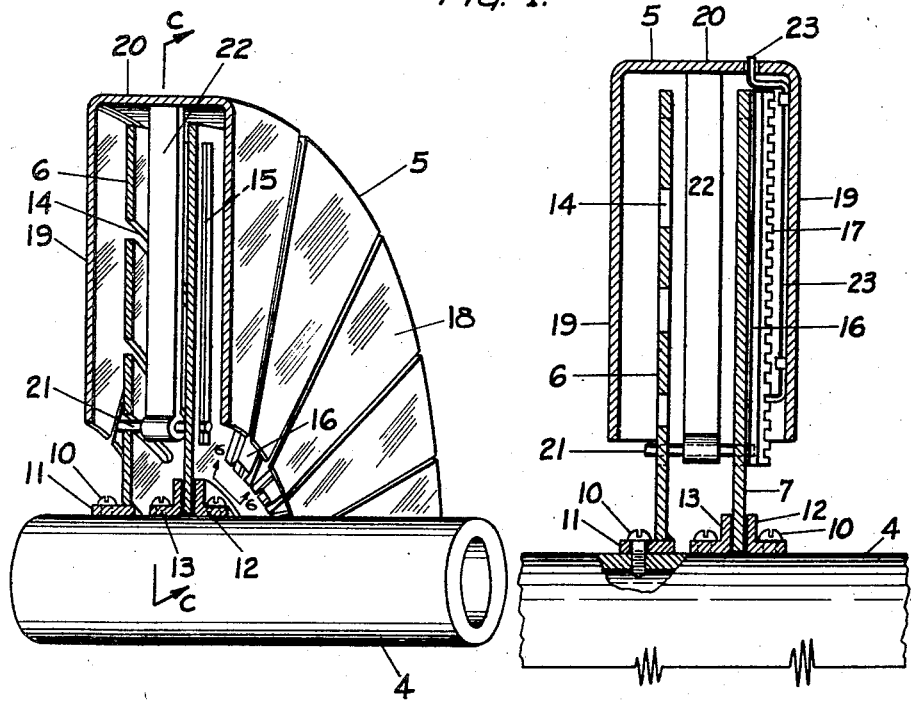
Fig. 2 is a side view partially in section of one of the elements of the support but in which certain of the parts are omitted for clarity.
Fig. 5 is a partial section of the invention taken along line C—C of Fig. 2.
Figure 6:
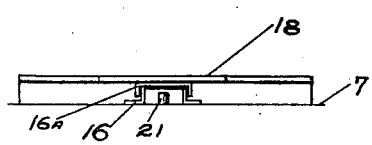
Fig. 6 is a view taken at 6—6 of Fig. 2.
Figure 3:
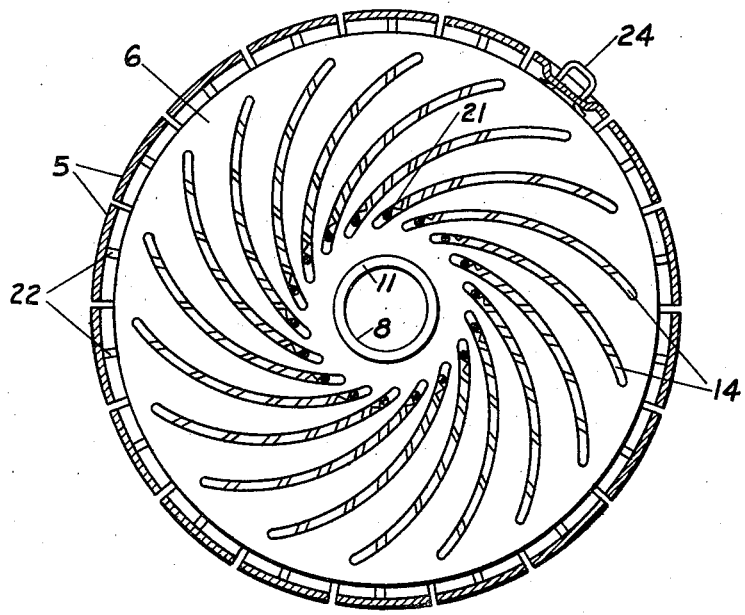
Fig. 3 is an end view in section taken along line B—B of Fig. 1.
Figure 4:
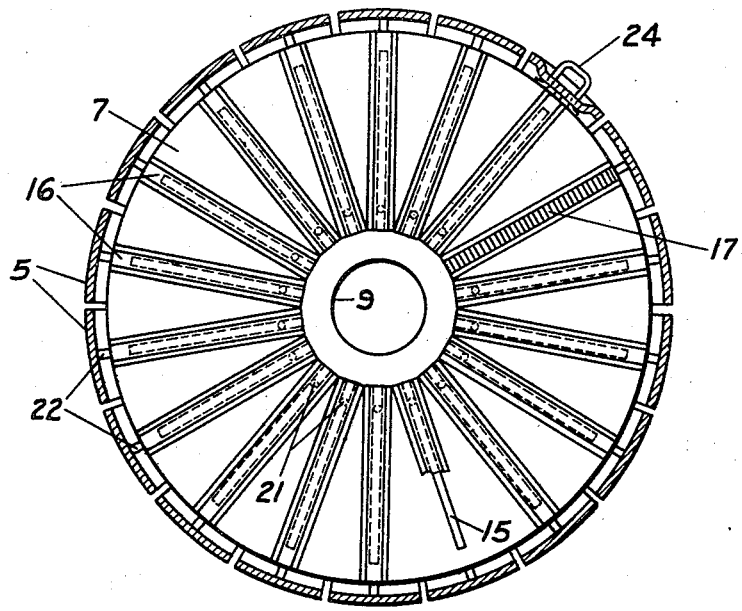
Fig. 4 is an end view in section along the line A—A of Fig. 1.

Disc 7 is formed to provide an equal number of equally spaced slots 15 extending in a radial direction. The location of both ends of each radial slot 15 coincides with that of the corresponding ends of a slot 14 of the companion disc. Disc 7 is strengthened by providing housings 16 in the form of channel guides covering the slots as illustrated in Figs. 4 and 5, located on the side of disc 7 facing away from companion disc 6. These guides, as shown in Figs. 6, are engaged by a bracket 16a secured to the inner surface of each of the expansible sections. Thus, as the segmental sections are withdrawn or retracted, they are restrained to move radially with respect to the discs. On one of these housings is provided a rack 17 having a series of equally spaced notches 17a. The relationship of each pair of slots 14 and 15 is such that rotation of disc 7 with respect to its companion disc 6 of the pair will produce movement of a body engaging both slots at points the same distance from the center of both discs along the radial slot 15.

The expanding feature of each section includes a series of substantially identical U-shaped segmental shoes 18, each shoe consisting of parallel side members 19 and a face portion 20 forming a sector of a hollow cylinder adapted to receive a portion of a pair of discs 6 and 7. When in the collapsed or retracted position, the segmental shoes of a unit form, substantially, a closed regular cylinder and when extended to the greatest diameter, the segmental shoes 18 have sufficient depth to prevent the discs 6 and 7 from being completely uncovered and exposed. As illustrated in Figs. 2 and 6 each shoe is constrained to follow the path defined by a cooperating pair of slots 14 and 15 and a guide member 16. A rod 21 which is perpendicular to the side members 19 and discs 6 and 7 engages slots 14 and 15 so that by reason of its being rigidly secured to segmental shoe 18, preferably at the inner side of face portion 20 by means of a bar or plate 22, the shoes 18 are caused to move outward or inward depending upon the direction in which the shaft 4 and disc 6 are rotated. In order to secure the segments of any one section in a selected position, a latch 23 is provided for engaging with the notches 17a of rack 17. A handle 24, as shown in Fig. 4 is installed on one of the segments, preferably on one adjacent the latch which may be gripped for assisting in withdrawing the various segments of a unit to a given diameter and also to prevent rotation of the various segments when the shaft is rotated.

In order to afford a better understanding of the invention the intended mode of operation is as follows: The entire support with all segments retracted is substantially in the form of a cylinder, wherein the segments form housings over the segment operating mechanisms and discs to prevent material supported on the work support from fouling this structure. Assuming it is in this condition and it is desired to extend the segments of any one section, the latch 23 is released. The operator grasps handle 24 firmly to prevent rotation of the sector and causes shaft 4 to be rotated in a clockwise direction.

By reason of the slots 14 and 15 into which the ends of pin 21 extend, the shoes of each section are all caused to be withdrawn to the diameter desired, after which latch 23 is turned into the locking position. Depending upon the final shape to be assumed by the support, the various sections are expanded or contracted as desired. As soon as all the sections have been adjusted and locked into position, the work 25, may be constructed from laminated fabric, which is applied as the support is rotated and shaped to conform to the portion of the support over which the laminated material lies. Upon completion of the work it may be removed in two pieces, as two uniform shells, by cutting longitudinally through the wall thereof at two diametrically opposed sections. The support is then ready for use again or it may be readjusted to provide a new contour for forming a valve, fitting or flange cover of a different shape or size.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

We claim:

1. An expansible work support, upon which may be formed heat insulators for use on valves, pipe flanges, couplings and the like of a substantially cylindrical hollow shape, mounted for rotation about an axis which is composed of a series of cylindrical sections mounted closely adjacent each other along a common axis, each section including means for varying the diameter of that section independently of all other sections whereby the work support may assume the configuration of a stepped cylinder, and means in cooperation with each section for locking that section in position independently of all other sections.

2. An expansible work support, upon which may be formed heat insulators for use on valves, pipe flanges, couplings and the like of a substantially cylindrical hollow shape, comprising a series of cylinders mounted on a common shaft, each cylinder including a pair of discs mounted in spaced relationship on said shaft, a series of segmental units mounted on said discs, means engaging the discs and segmental units for securing the segments of one cylinder radially, and means for securing all the segments of one unit in any one of a plurality of radial positions.

3. A work support, upon which may be formed heat insulators for use on valves, pipe flanges, couplings and the like of a substantially cylindrical hollow shape, comprising a series of expansible cylinders mounted closely adjacent each other on a common axis, each cylinder comprising a pair of juxtaposed discs and a plurality of segments, each segment including a face and side pieces, said segments so positioned on said discs that said side and face pieces form housings thereover.

4. An expansible support upon which may be formed heat insulators for use on valves, pipe flanges, couplings and the like of a substantially cylindrical hollow shape, comprising a series of cylinders mounted closely adjacent each other along an axis whereby said cylinders provide a substantially continuous support for work material placed thereon, each cylinder including expansible means and operating means associated with said expansible means, said expansible means formed to provide a shield for said operating means to prevent said work material from contacting said operating means.

5. A mandrel upon which may be formed heat insulators, for use on valves, pipe flanges, couplings and the like, of a substantially cylindrical hollow shape comprising a plurality of expansible cylindrical independent sections mounted in juxtaposition along a common cylindrical shaft, each of said sections consisting of a plurality of U-shaped segmental shoes, each of said sections being radially adjustable independently of all other sections and adapted to be locked into any one of a number of preselected positions.

6. A mandrel upon which may be formed heat insulators for valves, pipe flanges, couplings, and the like, of a substantially cylindrical hollow shape comprising a series of expansible cylindrical independent sections, each section consisting of a plurality of segmental shoes having arcuate exterior surfaces and including means independent of all other sections for expanding each section into a plurality of positions having different diameters while maintaining the contour of said arcuate surfaces substantially circular, and means for securing each of said sections into any one of said plurality of expanded positions.

MERCER L. WHITSON.
HIAWATHA F. COLLETTE.

REFERENCES CITED

The following references are of record in the file of this patent:

UNITED STATES PATENTS

| Number | Name | Date |
| --- | --- | --- |
| 867,431 | Simpson | Oct. 1, 1907 |
| 1,607,384 | Ball | Nov. 16, 1926 |
| 1,734,773 | Murray | Nov. 5, 1929 |
| 1,795,021 | Goin | Mar. 3, 1931 |